(12) United States Patent
Kato et al.

(10) Patent No.: US 8,101,884 B2
(45) Date of Patent: Jan. 24, 2012

(54) METHOD FOR PRODUCTION OF A PRESSURE-SENSITIVE ADHESIVE SHEET

(75) Inventors: Kiichiro Kato, Warabi (JP); Kazuya Kato, Warabi (JP); Takashi Takemoto, Warabi (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 12/588,229

(22) Filed: Oct. 8, 2009

(65) Prior Publication Data

US 2010/0032088 A1 Feb. 11, 2010

Related U.S. Application Data

(62) Division of application No. 10/539,300, filed on Mar. 21, 2006, now abandoned.

(30) Foreign Application Priority Data

| Dec. 27, 2002 | (JP) | 2002-379279 |
| Aug. 28, 2003 | (JP) | 2003-304028 |
| Oct. 29, 2003 | (WO) | PCT/JP03/13866 |
| Dec. 3, 2003 | (WO) | PCT/JP03/15458 |

(51) Int. Cl.
B23K 26/00 (2006.01)
B29C 65/00 (2006.01)
(52) U.S. Cl. ............... 219/121.71; 156/272.8
(58) Field of Classification Search ............ 219/121.7, 219/121.71, 121.72; 156/250–252, 272.8; 428/131, 343
See application file for complete search history.

(56) References Cited

U.S. PATENT DOCUMENTS

| 3,085,024 A | 4/1963 | Blackford |
| 5,275,856 A | 1/1994 | Calhoun et al. |
| 5,810,756 A | 9/1998 | Montecalvo et al. |
| 6,388,231 B1 * | 5/2002 | Andrews .............. 219/121.69 |
| 6,627,844 B2 | 9/2003 | Liu et al. |

FOREIGN PATENT DOCUMENTS

| EP | 1 577 358 A1 | 9/2005 |
| EP | 1 767 604 A1 | 3/2007 |
| JP | 62-081473 | 4/1987 |

(Continued)

OTHER PUBLICATIONS

Office Action dated Aug. 14, 2008 in corresponding European patent application No. 03777190.4-2102 (and English Translation).

(Continued)

*Primary Examiner* — Sang Paik
(74) *Attorney, Agent, or Firm* — Posz Law Group, PLC

(57) ABSTRACT

A pressure sensitive adhesive sheet 1 includes a base material 11 and a pressure sensitive adhesive layer 12. A plurality of through holes 2 pass through one face of the pressure sensitive adhesive sheet 1 to the other face. The hole diameter of the through holes 2 is 0.1 to 300 μm and the hole density is 30 to 50,000/100 cm². It is preferable to form the through holes 2 using a laser beam machining. In the pressure sensitive adhesive sheet 1, an air trapping or a blister can be prevented or removed without disfiguring the pressure sensitive adhesive sheet and while maintaining sufficient adhesive strength.

14 Claims, 5 Drawing Sheets

FOREIGN PATENT DOCUMENTS

| | | | |
|---|---|---|---|
| JP | 01125345 U | | 2/1988 |
| JP | 1-125345 | * | 8/1989 |
| JP | 02-107682 A | | 4/1990 |
| JP | A-04-055489 | | 2/1992 |
| JP | 4-100235 U | | 8/1992 |
| JP | 07-164873 | | 6/1995 |
| JP | A-8-287523 | | 11/1996 |
| JP | 10-195395 | | 7/1998 |
| JP | 2002-002777 | | 1/2002 |
| JP | 2002-294044 | | 10/2002 |
| JP | A-2003-129014 | | 5/2003 |

OTHER PUBLICATIONS

Office Action dated May 31, 2007 in corresponding Indian patent application No. 2643/DELNP/2005 (and English Translation).
Office Action dated Feb. 12, 2008 in corresponding Australian patent application No. 2003289133.
Search Report dated Jul. 15, 2008 in corresponding European patent application No. 08006171.6-2102 (and English Translation).
Search Report dated Oct. 6, 2006 in corresponding Austrian patent application No. 200504178-5 (and English Translation).

* cited by examiner (a)

(b)

(c)

(d)

Laser Beam Machining (a)

(b)

(c)

(d)

(e)

Laser Beam Machining (f)

(a)

(b)

METHOD FOR PRODUCTION OF A PRESSURE-SENSITIVE ADHESIVE SHEET

CROSS REFERENCE TO RELATED APPLICATION

This application is a divisional application of U.S. application Ser. No. 10/539,300, which was filed on Mar. 21, 2006.

BACKGROUND OF THE DISCLOSURE

The present invention relates to a method of production of a pressure sensitive adhesive sheet capable of preventing or removing trapped air, or a blister.

When manually sticking a pressure sensitive adhesive sheet on an adherend, there has been a problem that an air trapping can be formed between the adherend and the adhesive face so that the pressure sensitive adhesive sheet is disfigured in some cases. This air trapping is likely to occur more often when the area of the pressure sensitive adhesive sheet is large.

In order to solve the problem in the appearance of the pressure sensitive adhesive sheet due to the air trapping, it has been performed that a pressure sensitive adhesive sheet is replaced by the other pressure sensitive adhesive sheet, a pressure sensitive adhesive sheet is removed and attached again, or a hole is formed using a needle in the expanded portion of the pressure sensitive adhesive sheet to deflate air in question. However, the following problems have often occurred. For example, when replacing the pressure sensitive adhesive sheet, it is not only troublesome, but also causes an increase in the cost. In addition, when attaching the pressure sensitive adhesive sheet again, the pressure sensitive adhesive sheet may be damaged, wrinkles may be generated on the surface, or the pressure sensitive adhesive properties may be deteriorated. On the other hand, the method to make a hole using a needle disfigures the pressure sensitive adhesive sheet.

In order to prevent an air trapping, there has been used a method to attach water onto the adherend or the adhesive face in advance of sticking. However, when large-size pressure sensitive adhesive sheets such as a glass shatterproof film for windows, a decorative film, a marking film or the like are stuck, much time and much effort are required. In addition, apparatus have been used to stick such sheets to prevent an air trapping rather than manual work. However, sticking by apparatus cannot always be applied depending on uses of the pressure sensitive adhesive sheet or portion and/or shape of the adherend.

In the meantime, resin materials such as an acrylic resin, an ABS resin, a polystyrene resin, a polycarbonate resin or the like generate gas either by heating or without heating. When a pressure sensitive adhesive sheet is stuck to the adherend made from such a resin material, the gas generated from the adherend causes a blister in the pressure sensitive adhesive sheet.

In order to solve the above problems, there has been proposed a pressure sensitive adhesive sheet where a plurality of independent small projections are placed in a disseminated dot state on an adhesive face of the pressure sensitive adhesive layer in Gazette of Japanese Utility Model Registration No. 2503717 and Gazette of Japanese Utility Model Registration No. 2587198. In this pressure sensitive adhesive sheet, the tip of the small projections of the pressure sensitive adhesive layer is closely contacted to the adherend and the flat base surface of the pressure sensitive adhesive layer is kept spacing from the adherend, therefore a gap leading to the outside between the flat base surface of the pressure sensitive adhesive layer and the adherend is formed. Consequently, by deflating air or gas from the gap to the outside, an air trapping or a blister can be prevented.

However, on the pressure sensitive adhesive sheet disclosed in the above gazettes, there have been problems that an adhesive strength is poor because only the tip of the small projections in the pressure sensitive adhesive layer is bonded to the adherend, and water, chemicals or the like can easily be infiltrated between the pressure sensitive adhesive layer and the adherend, thus lowering an adhesive strength moreover. Even though such an adhesive sheet is strongly pressed to the adherend, an adhesive strength is not strong enough due to the small projections of the pressure sensitive adhesive layer. Furthermore, in that cases, the gap leading to the outside is filled up, therefore a blister cannot be prevented, which is formed while gas is generated from the adherend.

DISCLOSURE OF THE INVENTION

The present invention was made in consideration with the above circumstances and has as an object to provide a pressure sensitive adhesive sheet capable of preventing or removing an air trapping or a blister without disfiguring the pressure sensitive adhesive sheet and while securing a sufficient adhesive strength, and the method for production of such a pressure sensitive adhesive sheet.

In order to achieve the above object, a first aspect of the present invention provides a pressure sensitive adhesive sheet, comprising a base material and a pressure sensitive adhesive layer in which a plurality of through holes passing through one face to the other face are formed, wherein the hole diameter of the through holes at the base material and the pressure sensitive adhesive layer is 0.1 to 300 μm and the hole density is 30 to 50,000/100 cm$^2$ (invention 1).

In the present invention, "sheet" means including film and tape, and "film" means including sheet and tape.

According to the pressure sensitive adhesive sheet of the above invention (invention 1), air between the adherend and the adhesive face is deflated to the outside of the surface of the pressure sensitive adhesive sheet via the through holes, thus air is hardly caught when sticking the pressure sensitive adhesive sheet on the adherend. Therefore, an air trapping can be prevented. Even though air is caught and an air trapping is formed, the air trapping can be eliminated by pressing an air trapping part or the vicinity of an air trapping part (including the air trapping part) to deflate air to the outside of the surface of the pressure sensitive adhesive sheet via the through holes. Furthermore, even when gas is generated from the adherend after sticking the pressure sensitive adhesive sheet on the adherend, gas is deflated to the outside of the surface of the pressure sensitive adhesive sheet via the through holes. Therefore, a blister can be prevented.

In addition, since the hole diameter of the through holes is less than 300 μm, the through holes are not noticeable on the surface of the pressure sensitive adhesive sheet, thus the pressure sensitive adhesive sheet is not disfigured. Furthermore, since the density of the through holes is less than 50,000/100 cm$^2$, the mechanical strength of the pressure sensitive adhesive sheet is maintained.

In the above invention (invention 1), it is preferable that the hole diameter of the through holes gets gradually smaller from the back surface to the surface of the pressure sensitive adhesive sheet (invention 2). As the hole diameter of the through holes changes like this, the through holes are getting difficult to be noticeable on the surface of the pressure sensitive adhesive sheet. Therefore, the appearance of the pressure sensitive adhesive sheet can be maintained in a good condition.

In the above invention (invention 1 or 2), it is preferable that the through holes are formed by a laser beam machining (invention 3). According to a laser beam machining, fine through holes having good air deflation properties can be easily formed with desired hole density. However, a method to form the through holes is not limited thereto. For example, the through holes can be formed by water jet, micro drill, precision press, hot needle, fusing perforation, etc.

A second aspect of the present invention provides a method for production of pressure sensitive adhesive sheet, comprising the steps of; preparing a pressure sensitive adhesive sheet comprising a base material, a pressure sensitive adhesive layer and, as desired, further a release material, and performing a hole-forming processing on the pressure sensitive adhesive sheet to form through holes such that the hole diameter at the base material and the pressure sensitive adhesive layer is 0.1 to 300 μm and the hole density is 30 to 50,000/100 cm$^2$ (invention 4).

According to the above invention (invention 4), pressure sensitive adhesive sheets can be produced, from which an air trapping or a blister can be prevented or removed by deflating air between the adherend and the adhesive face or gas generating from the adherend via the through holes.

In the above invention (invention 4), it is preferable that the hole-forming processing is a laser beam machining (invention 5). In this case, it is preferable that the laser beam machining is performed from the back surface side of the pressure sensitive adhesive sheet (invention 6). Here the back surface of the pressure sensitive adhesive sheet refers to the opposite side to the surface of the pressure sensitive adhesive sheet, to the lower surface of a release material in case there exists a release material as the lowest layer, or to the adhesive face of the pressure sensitive adhesive layer in case the pressure sensitive adhesive layer is exposed without any release material in presence.

When forming the through holes by a laser beam machining, since many of the through holes are tapered, the hole diameter of the through holes at the surface of the pressure sensitive adhesive sheet is smaller than at the back surface of the pressure sensitive adhesive sheet by performing a laser beam machining from the back surface side of the pressure sensitive adhesive sheet. Accordingly, the through holes at the surface of the pressure sensitive adhesive sheet are much less noticeable so that the appearance of the pressure sensitive adhesive sheet can be maintained in a good condition.

In the above invention (invention 6), it is preferable that a laser is directly radiated to the pressure sensitive adhesive layer (invention 7). When a release material is laminated on the pressure sensitive adhesive layer, it is preferable that the release material laminated on the pressure sensitive adhesive layer is peeled from the pressure sensitive adhesive layer, a laser is directly radiated to the pressure sensitive adhesive layer, and then the release material is laminated again on the pressure sensitive adhesive layer (invention 8).

When the third layer such as a release material or the like is laminated on the pressure sensitive adhesive layer, if a laser is radiated to the pressure sensitive adhesive layer through the third layer, the dross to be formed on the third layer may enlarge the opening of the through holes in the pressure sensitive adhesive layer depending on the materials of the third layer. Therefore, the accuracy of the hole diameter or the hole density of the through holes to be formed on the pressure sensitive adhesive sheet is deteriorated. In addition, if the openings of the through holes enlarge as the above, then internal spaces of the through holes becomes large so that air in the through hole or water which entered the through hole may influence the surface of the pressure sensitive adhesive sheet in any way after the pressure sensitive adhesive sheet is stuck to the adherend.

According to the above invention (invention 7 or 8), enlarging the opening of the through holes in the pressure sensitive adhesive layer due to the third layer is avoided, thus the through holes can be formed such that the accuracy of the hole diameter of the holes or the hole density is high and internal space is small. In addition, with interposing no third layer, the laser radiation time can be shortened or the laser output energy can be low. If the laser output energy is low, a heat has less effect on the pressure sensitive adhesive sheet. Therefore, the dross can be reduced and the through holes in a uniform shape can be formed.

In the above invention (inventions 4 to 8), it is preferable that the laser beam machining is performed while a process material or a removable protective sheet is laminated on the surface of the base material (invention 9). Here, the process material refers to an assistant material to form any layer. For example, when forming a layer by a cast film process, a process material is used as a supporter of a resin solution for forming layer. In general, the process material is obtained by release processing on a paper or a resin film, which is peeled from the pressure sensitive adhesive sheet after the production of the pressure sensitive adhesive sheet or when the pressure sensitive adhesive sheet is used. On the other hand, the removable protective sheet refers to a protective sheet that can be peeled after a laser beam machining is performed. For example, a pressure sensitive adhesive protective sheet constituted by a base material and a removable pressure sensitive adhesive layer can be used.

When the through holes are formed by a laser beam machining, melt due to the heat, so-called dross, may be attached around the opening of the through holes in some cases. However, if a process material or a protective sheet is laminated on the surface of the base material, the dross is attached to the process material or the protective sheet rather than the base material. Thus, the appearance of the pressure sensitive adhesive sheet can be maintained in a better condition.

In addition, when a laser beam machining is performed from the side of the process material, since the through holes are formed in taper, the hole diameter of the through holes at the surface of the base material gets smaller than when using no process material or protective sheet, the appearance of the surface of the pressure sensitive adhesive sheet can be maintained in a further better condition.

Note that, when the process material or the protective sheet is peeled from the base material prior to sticking the pressure sensitive adhesive sheet to the adherend, the holes formed by a laser beam machining need not to be passing through the process material or the protective sheet.

As described above, according to the present invention, a pressure sensitive adhesive sheet capable of preventing or removing an air trapping or a blister can be obtained without disfiguring the pressure sensitive adhesive sheet, while securing a sufficient adhesive strength.

BEST MODE FOR CARRYING OUT THE INVENTION

Embodiments of the present invention will be described as follows:

Adhesive Sheet

Figure 1:
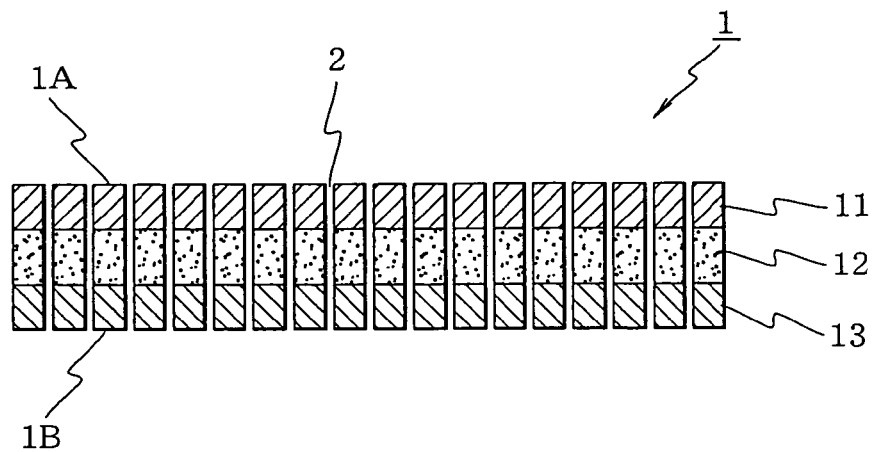
FIG. 1 is a sectional view of a pressure sensitive adhesive sheet according to an embodiment of the present invention.

FIG. 1 is a sectional view of a pressure sensitive adhesive sheet according to an embodiment of the present invention.

As shown in FIG. 1, a pressure sensitive adhesive sheet 1 according to the preferred embodiment of the present invention is prepared by laminating a base material 11, a pressure sensitive adhesive layer 12 and a release material 13. However, the release material 13 is peeled when the pressure sensitive adhesive sheet 1 is used.

In the pressure sensitive adhesive sheet 1, a plurality of through holes 2 are formed, which are passing through the base material 11, the pressure sensitive adhesive layer 12 and the release material 13 from the surface 1A of the pressure sensitive adhesive sheet 1 to the back surface 1B of the pressure sensitive adhesive sheet 1. When using the pressure sensitive adhesive sheet 1, air between the adherend and the adhesive face of the pressure sensitive adhesive layer 12 or gas generating from the adherend can be deflated to the outside of the surface 1A of the pressure sensitive adhesive sheet 1 via the through holes 2 so that an air trapping or a blister can be prevented or removed as described later.

The horizontal cross sectional shape of the through hole 2 is not particularly limited. However, the hole diameter of the through hole 2 at the base material 11 and the pressure sensitive adhesive layer 12 is 0.1 to 300 μm, and preferably 0.5 to 150 μm. If the hole diameter of the through hole 2 is less than 0.1 μm, it is difficult to deflate air or gas. If the hole diameter of the through hole 2 is more than 300 μm, the through hole 2 can be noticeable, thus the pressure sensitive adhesive sheet 1 is disfigured.

Note that, if the hole diameter of the through hole 2 at the surface 1A of the pressure sensitive adhesive sheet 1 is 40 μm or less, the hole itself of the through hole 2 (internal space of the through hole 2) can be invisible to the naked eye. Therefore, in case it is particularly required that the hole itself of the through hole 2 is not invisible on the appearance of the pressure sensitive adhesive sheet 1, it is preferable that the upper limit of the hole diameter of the through hole 2 at the surface 1A of the pressure sensitive adhesive sheet 1 is 40 μm. In this case, when the base material 11 is transparent in particular, since the hole diameter in the base material 11 and the pressure sensitive adhesive layer 12 as well as at the surface 1A of the pressure sensitive adhesive sheet 1 can influence the visibility of the hole, it is preferable that the upper limit of the hole diameter of the through hole 2 in the base material 11 and the pressure sensitive adhesive layer 12 is particularly 60 μm.

Figure 2:
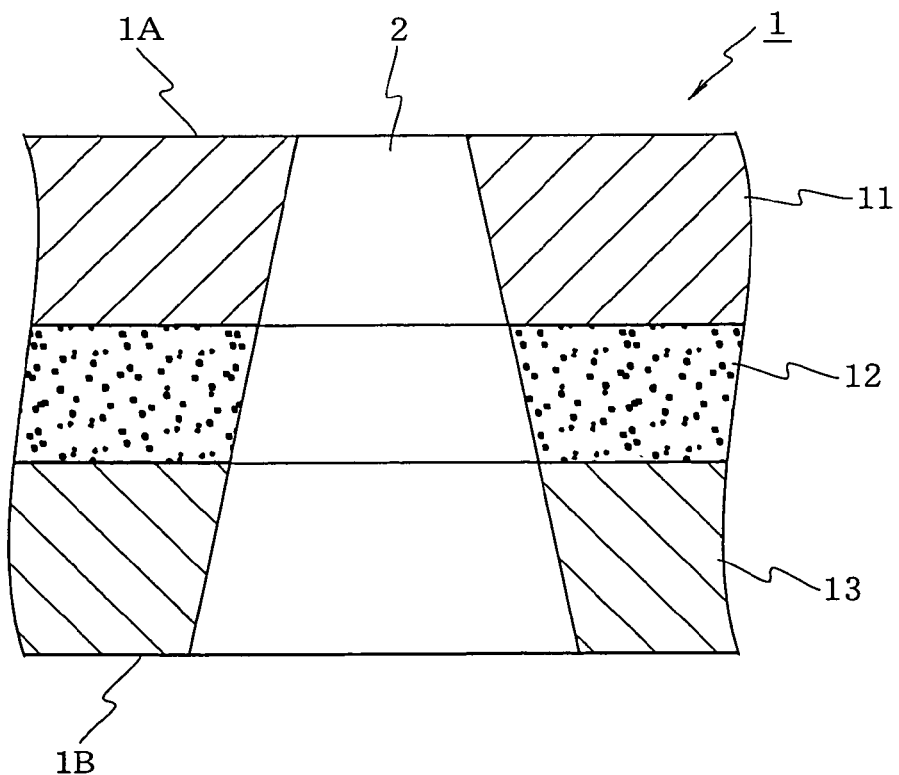
FIG. 2 is a partially enlarged sectional view of a pressure sensitive adhesive sheet according to an embodiment of the present invention.

The hole diameter of the through hole 2 can be uniform in a thickness direction of the pressure sensitive adhesive sheet 1 or can be changed in a thickness direction of the pressure sensitive adhesive sheet 1. When the hole diameter of the through hole 2 is changed in a thickness direction of the pressure sensitive adhesive sheet 1, it is preferable that the hole diameter of the through hole 2 gets gradually smaller from the back surface 1B to the surface 1A of the pressure sensitive adhesive sheet 1, as shown in FIG. 2. Since the hole diameter of the through hole 2 is changed like this, the through hole 2 on the surface 1A of the pressure sensitive adhesive sheet is much less noticeable. Therefore, the appearance of the pressure sensitive adhesive sheet 1 can be maintained in a good condition. However, in this case, the hole diameter of the through holes 2 in the base material 11 and the pressure sensitive adhesive layer 12 must be in the above range (0.1 to 300 μm).

The hole density of the through hole 2 is 30 to 50,000/100 $cm^2$, and preferably 100 to 10,000/100 $cm^2$. If the hole density of the through hole 2 is less than 30/100 $cm^2$, it is difficult to deflate air or gas. If the density is more than 50,000/100 $cm^2$, the mechanical strength of the pressure sensitive adhesive sheet 1 is deteriorated.

It is preferable to form the through hole 2 by a laser beam machining as set forth later. According to a laser beam machining, fine through holes having good air deflation properties can be easily formed with desired hole density. However, a method to form the through holes is not limited thereto. For example, the through holes can be formed by water jet, micro drill, precision press, hot needle, fusing perforation, etc.

As far as the through holes 2 can be formed in the base material 11, the materials of the base material 11 are not particularly limited. For example, as for the materials of the base material 11, resin film, metal film, metallized resin film, a paper, a laminate thereof or the like can be used. When the base material 11 is made from resin film, the base material 11 can be opaque or transparent, but generally, if the base material 11 is opaque, the through holes 2 are more difficult to be noticeable.

As for resin films, there can be used, for example, films, foaming films or laminated films thereof comprising polyolefin such as polyethylene, polypropylene or the like; polyester such as polyethylene terephthalate, polybutylene terephthalate or the like; polyvinyl chloride, polystyrene, polyurethane, polycarbonate, polyamide, polyimide, poly methyl methacrylate, polybutene, polybutadiene, poly methyl pentene, ethylene-vinyl acetate copolymer, ethylene (meth)acrylic copolymer, ethylene (meth)acrylate copolymer, ABS resin, ionomer resin or the like. As for resin films, commercial films can be used, and films formed by a cast film process using a process material can also be used. As for paper, woodfree paper, glassine paper, coated paper, laminated paper or the like can be used.

As far as the through holes 2 can be formed in the process material using a desired hole-forming processing method, the process materials are not particularly limited. For example, various kinds of paper or resin films such as polyethylene terephthalate, polypropylene, polyethylene or the like which has been subjected to release treating using silicone type, polyester type, acrylic type, alkyd type or urethane type release agents or synthetic resins can be used. A thickness of the process material is usually about 10 to 200 μm, and preferably about 25 to 150 μm.

A thickness of the base material 11 is usually about 1 to 500 μm, and preferably about 3 to 300 μm. The thickness can be appropriately changed according to uses of the pressure sensitive adhesive sheet 1.

Kinds of the pressure sensitive adhesive for the pressure sensitive adhesive layer 12 are not particularly limited as far as the through hole 2 as described above can be formed in the pressure sensitive adhesive layer 12. The pressure sensitive adhesive can be any of acrylic type, polyester type, polyurethane type, rubber type, silicone type or the like. In addition, the pressure sensitive adhesive can be any of emulsion type, solvent type or solvent-free type, and also can be either crosslinking type or non-crosslinking type. Furthermore, the pressure sensitive adhesive can be any of strong type adhesive which has high adhesive strength, weak type adhesive which has low adhesive strength, or removable type adhesive which can repeat adhere and release.

A thickness of the pressure sensitive adhesive layer 12 is usually about 1 to 300 μm, and preferably about 5 to 100 μm. The thickness can be appropriately changed according to uses of the pressure sensitive adhesive sheet 1.

As far as the through holes 2 can be formed in the release material 13, the materials of the release material 13 are not particularly limited. For example, resin films of polyethylene terephthalate, polypropylene, polyethylene or the like or foaming films thereof or paper such as glassine paper, coated paper, laminated paper or the like which has been subjected to release treating using silicone type, fluorine type or carbamate including long-chain alkyl group type release agents can be used.

A thickness of the release material 13 is usually about 10 to 250 μm, and preferably about 20 to 200 μm. A thickness of a release agent in the release material 13 is usually 0.05 to 5 μm, and preferably 0.1 to 3 μm.

Production of Adhesive Sheet (1)

An example of method for production of the pressure sensitive adhesive sheet 1 of the above embodiment will be explained in reference to FIGS. 3(*a*) to (*d*).

Figure 3:
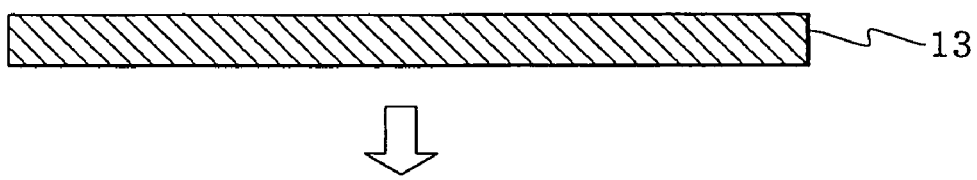
FIG. 3 is a sectional view showing a production method of a pressure sensitive adhesive sheet according to an embodiment of the present invention.
Figure 3:
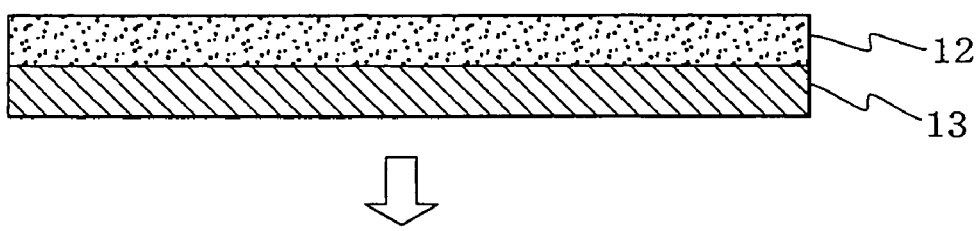
Figure 3:
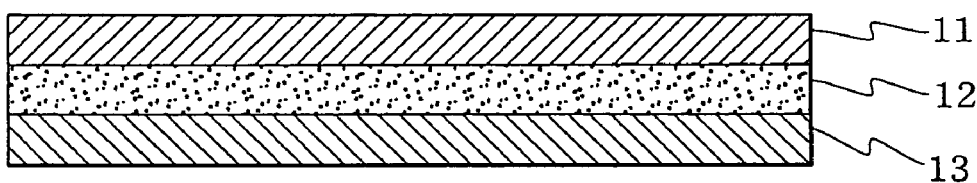
Figure 3:
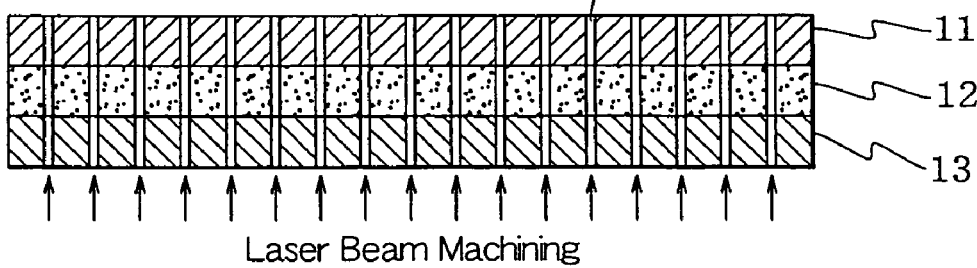

In this production method, the pressure sensitive adhesive layer 12 is first formed on the release surface of the release material 13 as shown in FIGS. 3(*a*) to (*b*). To form the pressure sensitive adhesive layer 12, for example, a coating agent containing a pressure sensitive adhesive which constitutes the pressure sensitive adhesive layer 12 and, if desired, a solvent is prepared. The coating agent is then applied to the release surface of the release material 13 using a coating machine such as roll coater, knife coater, roll-knife coater, air-knife coater, die coater, bar coater, gravure coater, curtain coater or the like, and dried.

Then, as shown in FIG. 3(*c*), the base material 11 is stuck with pressure onto the surface of the pressure sensitive adhesive layer 12 to obtain a laminate constituted by the base material 11, the pressure sensitive adhesive layer 12 and the release material 13. Further, as shown in FIG. 3(*d*), the through holes 2 are formed on the obtained laminate. In this production method, the though holes 2 are formed by a laser beam machining. It is preferable to perform a laser beam machining from the side of the release material 13. When forming the through holes 2 by a laser beam machining, since the through holes 2 are tapered in many cases as shown in FIG. 2, the hole diameter of the through holes 2 at the side of the base material 11 is smaller than at the side of the release material 13 by performing a laser beam machining from the side of the release material 13. Accordingly, the through holes 2 at the surface of the pressure sensitive adhesive sheet 1 are much less noticeable so that the appearance of the pressure sensitive adhesive sheet 1 can be maintained in a good condition.

Kinds of lasers to be used for a laser beam machining are not particularly limited. As for lasers, for example, carbon dioxide ($CO_2$) laser, TEA-$CO_2$ laser, YAG laser, UV-YAG laser, excimer laser, semiconductor laser, $YVO_4$ laser, YLF laser or the like can be used.

Note that, the release material 13 is peeled from the pressure sensitive adhesive layer 12 when the pressure sensitive adhesive sheet 1 is used.

A removable protective sheet can be laminated on the surface of the base material 11 in any step prior to performing a laser beam machining in this production method. As for the protective sheets, for example, known pressure sensitive adhesive protective sheet constituted by a base material and a removable pressure sensitive adhesive layer or the like can be used.

When the through holes 2 are formed by a laser beam machining, melt due to the heat, so-called dross, may be attached around the opening of the through holes 2 in some cases. However, if the protective sheet is laminated on the surface of the base material 11, the dross is attached to the protective sheet rather than the base material 11. Thus, the appearance of the pressure sensitive adhesive sheet 1 can be maintained in a better condition. In addition, if a laser beam machining is performed from the side of the protective sheet, since the through holes 2 are formed in taper, the hole diameter of the through holes 2 at the surface of the base material 11 is smaller than when using no protective sheet.

The above protective sheet is peeled from the base material 11 usually after production of the pressure sensitive adhesive sheet 1 is completed or before sticking the pressure sensitive adhesive sheet 1. However, the protective sheet can be peeled after sticking the pressure sensitive adhesive sheet 1 on the adherend while the protective sheet is laminated on it. When the protective sheet is peeled after sticking the pressure sensitive adhesive sheet 1 on the adherend, the through hole 2 needs to be passing through the protective sheet as well as the pressure sensitive adhesive layer 12 and the base material 11. On the other hand, when the protective sheet is peeled prior to sticking the pressure sensitive adhesive sheet 1, the through holes 2 do not have to be necessarily passing through the protective sheet. That is, when a laser beam machining is performed from side of the release material 13, a laser can be radiated such that the holes passing through the release material 13, the pressure sensitive adhesive layer 12 and the base material 11 are formed to the middle of the protective sheet.

Production of Adhesive Sheet (2)

Another example of method for production of the pressure sensitive adhesive sheet 1 of the above embodiment will be explained in reference to FIGS. 4(*a*) to (*e*).

Figure 4:
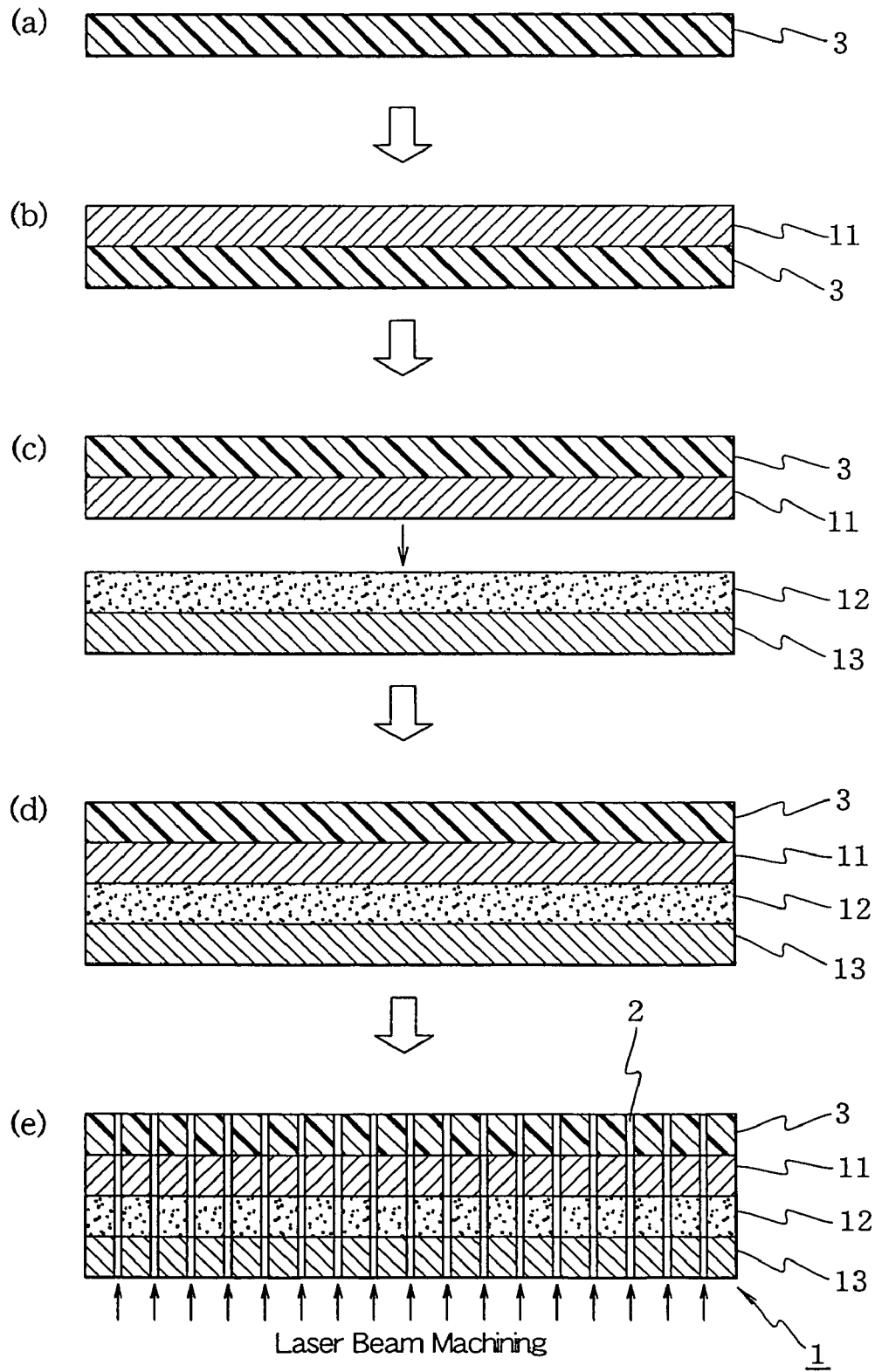
FIG. 4 is a sectional view showing another production method of a pressure sensitive adhesive sheet according to an embodiment of the present invention.

In this production method, the base material 11 is formed on the release surface of the process material 3 as shown in FIGS. 4(*a*) to (*b*). To form the base material 11, for example, a coating agent containing the resin which constitutes the base material 11 and, if desired, a solvent is prepared. The coating agent is then applied to the process material 3 using a coating machine such as roll coater, knife coater, roll-knife coater, air-knife coater, die coater, bar coater, gravure coater, curtain coater or the like, and dried.

On the other hand, as shown in FIG. 4(*c*), the pressure sensitive adhesive layer 12 is formed on the release surface of the release material 13 using the same method as in forming the pressure sensitive adhesive layer of the production method (1) for the pressure sensitive adhesive sheet as described above.

Then, as shown in FIG. 4(*d*), a laminate constituted by the process material 3 and the base material 11, and a laminate constituted by the pressure sensitive adhesive layer 12 and the release material 13 are bonded with pressure such that the base material 11 formed on the process material 3 and the pressure sensitive adhesive layer 12 formed on the release material 13 are closely contacted to obtain a laminate constituted by the process material 3, the base material 11, the pressure sensitive adhesive layer 12 and the release material 13.

As shown in FIG. 4(*e*), the through holes 2 are formed on the obtained laminate. In this production method, the through holes 2 are formed by a laser beam machining. It is preferable to perform this laser beam machining from the side of the release material 13 on the same reason as in the method (1) for production of the pressure sensitive adhesive sheet as described above. However, if a laser beam machining is performed from the side of the process material 3, since the through holes 2 are tapered, the hole diameter of the through holes 2 at the surface of the base material 11 is smaller than when the process material 3 is not used.

In addition, when the through holes 2 are formed by a laser beam machining, dross may be attached around the opening of the through holes 2 in some cases. However, since the process material 3 is laminated on the surface of the base material 11 in this production method, the dross is attached to the process material 3 rather than the base material 11. Thus, the appearance of the pressure sensitive adhesive sheet 1 can be maintained in a better condition.

Note that, the release material 13 is peeled from the pressure sensitive adhesive layer 12 when the pressure sensitive adhesive sheet 1 is used. On the other hand, the process material 3 is peeled from the base material 11 usually after production of the pressure sensitive adhesive sheet 1 is completed or before sticking the pressure sensitive adhesive sheet 1. However, the process material 3 can be peeled after sticking the pressure sensitive adhesive sheet 1 on the adherend while the process material 3 is laminated on it. When the process material 3 is peeled after sticking the pressure sensitive adhesive sheet 1 on the adherend, the through holes 2 need to be passing through the process material 3 as well as the pressure sensitive adhesive layer 12 and the base material 11. When the process material 3 is peeled prior to sticking the pressure sensitive adhesive sheet 1, the through holes 2 do not have to be necessarily passing through the process material 3. That is, when a laser beam machining is performed from the side of the release material 13, a laser can be radiated such that the holes passing through the release material 13, the pressure sensitive adhesive layer 12 and the base material 11 are formed to the middle of the process material 3.

Production of Adhesive Sheet (3)

Another example of method for production of the pressure sensitive adhesive sheet 1 of the above embodiment will be explained in reference to FIGS. 5(*a*) to (*f*).

Figure 5:
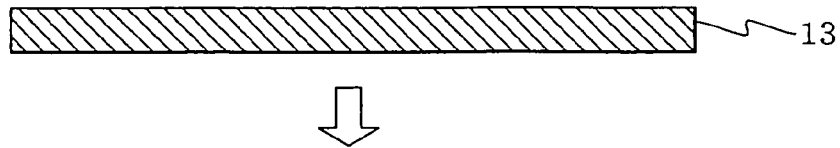
FIG. 5 is a sectional view showing another production method of a pressure sensitive adhesive sheet according to an embodiment of the present invention.
Figure 5:
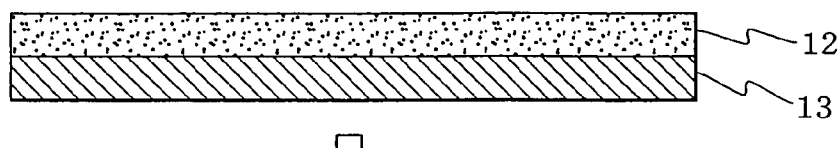
Figure 5:
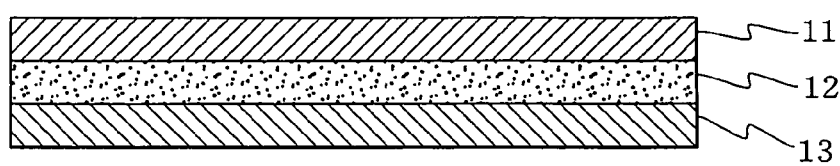
Figure 5:
Figure 5:
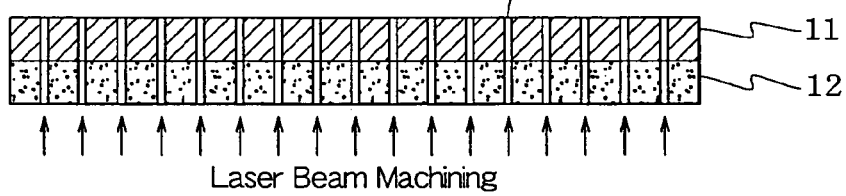
Figure 5:
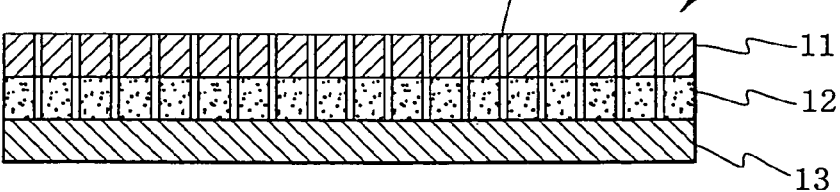

In this production method, as shown in FIGS. 5(*a*) to (*c*), a laminate constituted by the base material 11, the pressure sensitive adhesive layer 12 and the release material 13 is produced in the same method as the production method (1) of the pressure sensitive adhesive sheet as described above.

As shown in FIG. 5(*d*), the release material 13 is peeled from the pressure sensitive adhesive layer 12 and then a laser is directly radiating to the pressure sensitive adhesive layer 12 from the side of the pressure sensitive adhesive layer 12 as shown in FIG. 5(*e*). After that, the release material 13 is stuck again to the pressure sensitive adhesive layer 12 as shown in FIG. 5(*f*).

Figure 6:
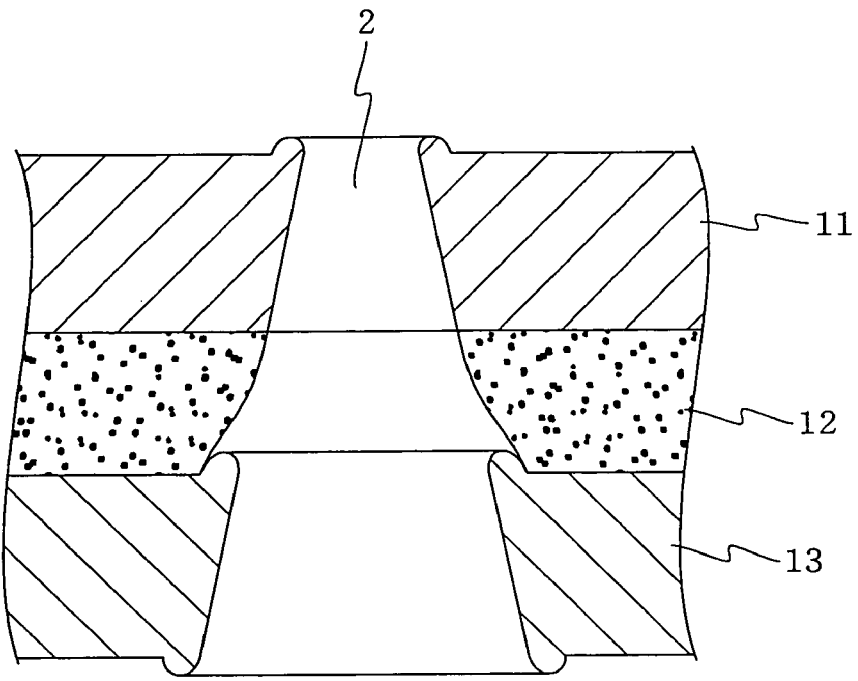
FIG. 6 is a partially enlarged sectional view of a pressure sensitive adhesive sheet according to an embodiment of the present invention.
Figure 6:
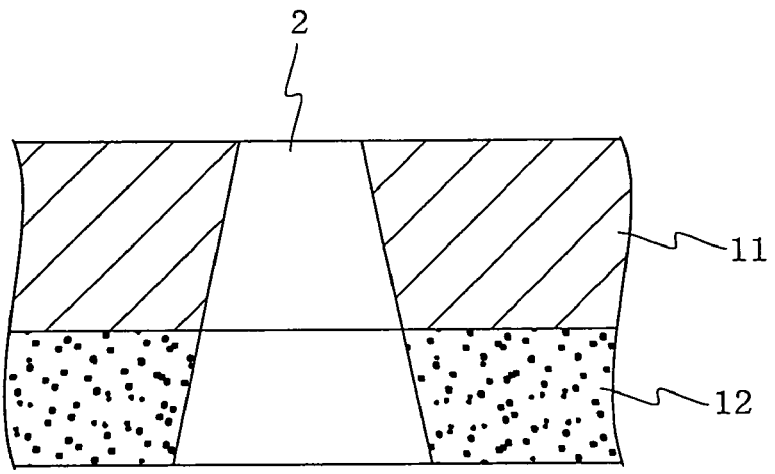

When radiating a laser from the side of the release material 13 while the release material 13 is laminated on the pressure sensitive adhesive layer 12, as shown in FIG. 6(*a*), the opening of the through hole 2 of the pressure sensitive adhesive layer 12 is enlarged due to the dross in some cases that is formed around the opening of the through hole 2 in the release material 13 depending on the material of the release material 13. In this case, the accuracy of the hole diameter or the hole density of the through holes 2 formed on the pressure sensitive adhesive sheet 1 is deteriorated. In addition, if the opening of the through hole 2 of the pressure sensitive adhesive layer 12 is enlarged, then internal space of the through hole 2 becomes large so that air in the through hole 2 or water which entered the through hole 2 or the like may influence the surface of the pressure sensitive adhesive sheet 1 in any way after sticking the pressure sensitive adhesive sheet 1 to the adherend. This kind of problem is likely to occur when the release material 13 is made from resin such as polyethylene terephthalate, polypropylene or the like.

According to this production method, once the release material 13 is peeled and a laser is directly radiated to the adhesive layer 12, the opening of the through hole 2 of the pressure sensitive adhesive layer 12 is not enlarged as shown in FIG. 6(*b*), thus resulting in high accuracy of the hole diameter or the hole density and small internal space of the through hole 2. In addition, when radiating a laser to the pressure sensitive adhesive layer 12, without interposing the release material 13, the laser radiation time can be shortened or the laser output energy can be low. If the laser output energy is low, a heat has less effect on the pressure sensitive adhesive layer 12 and the base material 11, thus dross or the like can be reduced and uniformly shaped through holes 2 can be formed.

Note that, in the production methods (1) to (3) above, the pressure sensitive adhesive layer 12 is formed on the release material 13 and the pressure sensitive adhesive layer 12 thus formed and the base material 11 are stuck together. However, the present invention is not limited thereto. For example, the pressure sensitive adhesive layer 12 can be formed directly on the base material 11 and the pressure sensitive adhesive layer 12 thus formed and the release material 13 can be stuck together.

Uses of Adhesive Sheet

When sticking the pressure sensitive adhesive sheet 1 on an adherend, the release material 13 is peeled from the pressure sensitive adhesive layer 12, the pressure sensitive adhesive sheet 1 is pressed onto the adherend such that an adhesive face of the exposed pressure sensitive adhesive layer 12 is closely contacted to the adherend. At this time, since air between the adherend and the adhesive face of the pressure sensitive adhesive layer 12 is deflated to the outside of the surface 1A of the pressure sensitive adhesive sheet 1 via the through hole 2 formed in the pressure sensitive adhesive sheet 1, air can hardly be caught between the adherend and the adhesive face, and an air trapping can be prevented. Even if air is caught and an air trapping is formed, by pressing again the air trapping part or the vicinity of the air trapping part (including the air trapping part), air is deflated to the outside of the surface 1A of the pressure sensitive adhesive sheet via the through hole 2 and the air trapping can be eliminated. Such an air trapping can be eliminated even after a long time since the pressure sensitive adhesive sheet 1 is stuck.

In addition, even when gas is generated from the adherend after sticking the pressure sensitive adhesive sheet 1 to the adherend, gas is deflated to the outside of the surface 1A of the pressure sensitive adhesive sheet 1 via the through hole 2 formed on the pressure sensitive adhesive sheet 1. Therefore a blister on the pressure sensitive adhesive sheet 1 can be prevented.

An air trapping or a blister can be prevented or removed from the pressure sensitive adhesive sheet 1 as described above. The through hole 2 formed on the pressure sensitive adhesive sheet 1 is extremely fine, therefore, the pressure sensitive adhesive sheet is not disfigured and the adhesive strength is not lowered despite of the presence of the through holes 2.

OTHER EMBODIMENTS

In the pressure sensitive adhesive sheet 1 of the above embodiment, the through holes 2 are passing through the release material 13. However, the present invention is not limited thereto. For example, the through holes 2 can be passing through only the base material 11 and the pressure sensitive adhesive layer 12. In addition, the pressure sensitive adhesive sheet 1 of the above embodiment has the release material 13, but the present invention is not limited thereto. For example, the release material 13 can be absent. In these cases, the material of the release material 13 does not need to be the one in which the through holes 2 can be formed. Further, the size, shape or the like of the pressure sensitive adhesive sheet 1 of the above embodiment are not particularly limited.

For example, the pressure sensitive adhesive sheet 1 may be a tape shaped one (pressure sensitive adhesive tape) constituted by the base material 11 and the pressure sensitive adhesive layer 12 only, which can be wound into a roll. In this case, the pressure sensitive adhesive layer 12 is overlapped on the surface (the face on which the pressure sensitive adhesive layer 12 is not laminated) of the base material 11. Therefore, it is preferable that the surface of the base material 11 has a release property such that the pressure sensitive adhesive layer 12 overlapped on the surface of the base material 11 can be smoothly peeled from the surface of the base material 11 when the pressure sensitive adhesive tape is pulled out from the roll.

As the base material 11, for example, (1) resin films as mentioned above of which surface has been subjected to release treating using silicone type, fluorine type or carbamate including long-chain alkyl group type release agent, (2) materials which has a release property itself, for example, films made from polyolefin resin such as polyethylene, polypropylene or the like and (3) laminated films which are obtained by laminating the above material having a release property and a material having a low release property, for example, polyethylene terephthalate or the like can be used. Note that, in the above case of (2), it is preferable that a treatment to advance the adhesive strength with the pressure sensitive adhesive layer 12 such as corona discharge treatment, flame treatment, ultraviolet-light irradiation treatment, primer treatment, solvent treatment or the like is performed on the back surface (the face on which the pressure sensitive adhesive layer 12 is laminated) of the base material 11.

The above pressure sensitive adhesive tape can be produced, for example, by the following production method.

(1) A pressure sensitive adhesive agent is coated on the surface of the base material 11. The laminate is wound into a roll, at the same time, the pressure sensitive adhesive agent is transferred from the surface of the base material 11 to the back surface of the base material 11. Then, the laminate constituted by the base material 11 and the pressure sensitive adhesive layer 12 laminated on the back surface of the base material 11 is pulled out from the roll. A laser is radiated to the laminate from the side of the pressure sensitive adhesive layer 12 to form through holes 2. After that, the laminate is wound into a roll again.

(2) A pressure sensitive adhesive agent is coated on the back surface of the base material 11 and dried to form the pressure sensitive adhesive layer 12. Then a laser is radiated to the laminate from the side of the pressure sensitive adhesive layer 12 to form through holes 2, and the laminate is wound into a roll again.

(3) A pressure sensitive adhesive agent is coated on the release surface of the release material 3. The release material 3 and the base material 11 are wound into a roll while they are stuck together such that the pressure sensitive adhesive agent is closely contacted to the back surface of the base material 11. After that, while peeling the release material 3 from the pressure sensitive adhesive layer 12, the laminate constituted by the base material 11 and the pressure sensitive adhesive layer 12 are pulled out from the roll. A laser is radiated to the laminate from the side of the pressure sensitive adhesive layer 12 to form through holes 2. Then, the above laminate is wound into a roll without sticking the release material 3.

In the any production method as described above, since through holes 2 are formed in the laminate constituted by the base material 11 and the pressure sensitive adhesive layer 12, air is hardly caught when the laminate is wound into a roll. So that a roll which does not have air trappings is easily formed.

EXAMPLES

The present invention will be described more specifically below using examples and the like. However, the scope of the present invention is not limited to or by these examples and the like.

Example 1

25 parts by weight of ethyl acetate was added to 100 parts by weight of acrylic type pressure sensitive adhesive agent (Coponyl N-2147 manufactured by Nippon Synthetic Chemical Industry Co., Ltd., solid content: 35 weight %), and then 1 part by weight of an isocynate type crosslinking agent (Colonate L manufactured by Nippon Polyurethane Industry Co., Ltd.) was added to them. The mixture was sufficiently agitated to obtain a coating agent of a pressure sensitive adhesive agent.

A release material (FPM-11 manufactured by Lintec Corporation, thickness: 175 µm) was produced by laminating a polyethylene on both faces of a woodfree paper and coating a silicone type release agent on one face. The coating agent of the pressure sensitive adhesive agent was coated with a knife coater on the release surface of the release material so as to reach a thickness of 30 µm following drying, and the coating agent of the pressure sensitive adhesive agent was dried for one minute at 90° C. to form a pressure sensitive adhesive layer. An opaque black base material (thickness: 100 µm) of polyvinyl chloride was stuck with pressure on the pressure sensitive adhesive layer thus formed to obtain a laminate of a 3-layers structure.

A UV-YAG laser was radiated to the obtained laminate from the side of the release material so that through holes having a hole diameter of 15 to 35 µm at the surface of the base material were formed with a hole density of 1,156/100 $cm^2$, thus a pressure sensitive adhesive sheet was produced.

Example 2

A pressure sensitive adhesive sheet was produced in a similar manner to the Example 1, except that the hole diameter of the through holes at the surface of the base material was 40 to 50 µm and the hole density was 4,900/100 $cm^2$.

Example 3

A laminate of a 3-layers structure was obtained in a similar manner to the Example 1, except that as for a base material, a transparent polyethylene terephthalate film (Lumirror T60 manufactured by Toray Inc., thickness: 50 µm) was used instead of polyvinyl chloride and as for a release material, a polyethylene terephthalate film coated with a silicone type release agent on one side (PET7511 manufactured by Lintec Corporation, thickness: 75 µm) was used.

An Excimer laser was radiated to the obtained laminate from the side of the release material so that through holes having a hole diameter of 0.5 to 10 µm at the surface of the base material and a hole diameter of 20 to 30 µm at the adhesive face (the hole diameter at the adhesive face is the maximum diameter in the base material and the pressure sensitive adhesive layer) were formed with a hole density of 10,000/100 $cm^2$, thus a pressure sensitive adhesive sheet was produced.

Example 4

A pressure sensitive adhesive sheet was produced in a similar manner to the Example 1, except that a laser was radiated from the side of the base material and the hole diameter of the through holes at the surface of the base material was about 60 µm.

Example 5

A pressure sensitive adhesive sheet was produced in a similar manner to the Example 1, except that a laser was radiated from the side of a base material using a $CO_2$ laser for a laser beam machining and the hole diameter of the through holes at the surface of the base material was about 100 µm.

Example 6

A pressure sensitive adhesive sheet was produced in a similar manner to the Example 1, except that the hole diameter of the through holes at the surface of the base material was 140 to 150 µm and the hole density was 100/100 $cm^2$.

Example 7

A pressure sensitive adhesive sheet was produced in a similar manner to the Example 1, except that a $CO_2$ laser was used for a laser beam machining, the laser was radiated from the side of the base material, the hole diameter of the through holes at the surface of the base material was about 250 µm and the hole density was 49/100 $cm^2$.

Example 8

A pressure sensitive adhesive sheet was produced in a similar manner to the Example 1, except that a release material was peeled, then a laser was radiated from the side of the adhesive face, and the hole diameter of the through holes at the surface of the base material was about 50 µm.

Example 9

A laminate of a 3-layers structure was obtained in a similar manner to the Example 1, except that as for a base material, a transparent polyethylene terephthalate film (Lumirror T60 manufactured by Toray Inc., thickness: 50 µm) was used instead of polyvinyl chloride.

A $CO_2$ laser was radiated to the obtained laminate from the side of the base material to form through holes having a hole diameter of about 70 µm at the surface of the base material and a hole diameter of about 80 µm at the adhesive face (the hole diameter at the adhesive face is the maximum diameter in the base material and the pressure sensitive adhesive layer) with a hole density of 1,156/100 $cm^2$, thus a pressure sensitive adhesive sheet was produced.

Example 10

100 parts by weight of a vinyl chloride resin, 2.5 parts by weight of an ultraviolet light absorber (benzotriazole type), 25 parts by weight of a polyester type plasticizer (Adekasizer PN260 manufactured by Asahi Denka Co., Ltd.), 10 parts by weight of a phthalate type plasticizer (DOP manufactured by Chisso Corporation), 20 parts by weight of a colorant (VTSK9311 black manufactured by Dainichiseika Color & Chemicals Mfg. Co., Ltd.), 3 parts by weight of a heat stabilizer (Ba/Zn type), 25 parts by weight of a solvent (butylcellosolve) and 25 parts by weight of a solvent (Supersol #1500 manufactured by Godo Solvents Co.) were mixed to obtain a coating agent of a base material.

As a process material, a polyethylene terephthalate film having one face release treated (U4Z-50 manufactured by Teijin DuPont Films Japan Limited, thickness: 50 µm) was prepared. The coating agent of the base material was coated on the release surface of the process material with a knife coater, so as to reach a thickness of 100 µm following drying, and the coating agent of the base material was dried for one minute at 140° C. and further for two minutes at 190° C. to form an opaque black base material.

On the other hand, a pressure sensitive adhesive layer was formed on the release material in a similar manner to the Example 1 and a laminate of a 4-layers structure was obtained by bonding with pressure the pressure sensitive adhesive layer and the base material formed on the above process material to be closely contacted together.

A $CO_2$ laser was radiated to the obtained laminate from the side of the process material to form through holes having a hole diameter of about 65 µm at the surface of the base material with a hole density of 1,156/100 $cm^2$, thus a pressure sensitive adhesive sheet was produced.

Example 11

A pressure sensitive adhesive sheet was produced in a similar manner to the Example 10, except that a UV-YAG laser was used for a laser beam machining, the laser was radiated from the side of the release material, and the hole diameter of the through holes at the surface of the base material was 20 to 40 µm.

Example 12

A laminate of a 3-layers structure was produced in a similar manner to the Example 1. Then, a $CO_2$ laser was radiated to the laminate from the side of the release material to form through holes having a hole diameter of 40 to 50 µm at the surface of the base material and a hole diameter of 120 to 150 µm at the adhesive face with a hole density of 2,500/100 $cm^2$ to obtain a pressure sensitive adhesive sheet.

Example 13

A laminate of a 3-layers structure was produced in a similar manner to the Example 1. Then, the release material was peeled from the pressure sensitive adhesive layer, and a $CO_2$ laser was radiated to the laminate from the side of the pressure sensitive adhesive layer to form through holes having a hole diameter of 40 µm at the surface of the base material and a hole diameter of about 80 μm at the adhesive face with a hole density of 2,500/100 cm². And the release material was stuck with pressure to the pressure sensitive adhesive layer again to obtain a pressure sensitive adhesive sheet.

Example 14

A laminate of a 3-layers structure was produced in a similar manner to the Example 1. Then, a pressure sensitive adhesive protective sheet constituted by a base material and a removable pressure sensitive adhesive layer (HT25SCBA manufactured by Panac Co., Ltd., thickness: 28 μm) was stuck to the surface of the base material of the laminate.

The release material was peeled from the pressure sensitive adhesive layer of the laminate, then a $CO_2$ laser was radiated to the laminate from the side of the pressure sensitive adhesive layer to form through holes having a hole diameter of 35 μm at the surface of the base material with a hole density of 2,500/100 cm². And the release material was stuck with pressure to the pressure sensitive adhesive layer again and the pressure sensitive adhesive protective sheet was peeled from the base material, thus a pressure sensitive adhesive sheet was produced.

Example 15

As a base material, a transparent polyethylene terephthalate film on which one face was release treated with a silicone type release agent (Cerapeel BK(T) manufactured by Toyo Metallizing Co., Ltd., thickness: 38 μm) was prepared. The coating agent of the pressure sensitive adhesive agent obtained in the Example 1 was coated with a knife coater on the release surface of the base material, so as to reach a thickness of 30 μm following drying, and the coating agent of the pressure sensitive adhesive agent was dried for one minute at 90° C. Thus a laminate tape (A) of a 2-layers structure constituted by the base material and the pressure sensitive adhesive layer laminated on the release surface of the base material was obtained.

Next, the above laminate tape (A) was wound into a roll, at the same time, the pressure sensitive adhesive agent was transferred from the release surface of the base material to the non-release surface of the base material to obtain a laminate tape (B) of a 2-layers structure constituted by the base material and the pressure sensitive adhesive layer laminated on the non-release surface of the base material.

The obtained laminate tape (B) was pulled out from the roll, and a laser was radiated to the laminate tape (B) from the side of the pressure sensitive adhesive layer to form through holes having a hole diameter of about 50 μm at the surface of the base material and a hole diameter of about 95 μm at the adhesive face (the hole diameter at the adhesive face is the maximum diameter) with a hole density of 2,500/100 cm².

Then the laminate tape (B) in which through holes were formed was wound into a roll again, thus a pressure sensitive adhesive tape (pressure sensitive adhesive sheet) was produced.

Example 16

A laminate of a 3-layers structure was produced in a similar manner to the Example 9. Then, the release material was peeled from the pressure sensitive adhesive layer, and a $CO_2$ laser was radiated to the laminate from the side of the pressure sensitive adhesive layer to form through holes having a hole diameter of about 35 μm at the surface of the base material and a hole diameter of about 85 μm at the adhesive face (the hole diameter at the adhesive face is the maximum diameter) with a hole density of 2,500/100 cm². And the release material was stuck with pressure to the pressure sensitive adhesive layer again to obtain a pressure sensitive adhesive sheet.

Comparative Example 1

A laminate of a 3-layers structure was produced in a similar manner to the Example 1. Without forming any through holes, a pressure sensitive adhesive sheet was produced.

Comparative Example 2

A pressure sensitive adhesive sheet was produced in a similar manner to the Example 1, except that the hole density of the through holes was 4/100 cm².

Comparative Example 3

A pressure sensitive adhesive sheet was produced in a similar manner to the Example 1, except that a laser was radiated from the side of the base material and the hole diameter of the through holes was about 500 μm.

Comparative Example 4

A pressureسn sensitive adhesive sheet was produced in a similar manner to the Example 2, except that as for a base material, a transparent polyethylene terephthalate film (Lumirror T60 manufactured by Toray Inc., thickness: 50 μm) was used instead of polyvinyl chloride, the hole diameter of the through holes at the adhesive face was about 130 to 140 μm and the hole density of the through holes was 102,400/100 cm².

Experiment Example

A test of eliminating air trapping and a test of tensile strength were performed on the obtained pressure sensitive adhesive sheet in Examples 1 to 16 and Comparative Examples 1 to 4 as follows. Moreover, it was visually judged whether the surfaces of the pressure sensitive adhesive sheets were disfigured or not because of existence of through holes, and an examination of hole visibility was performed as follows.

Test of eliminating air trapping: The pressure sensitive adhesive sheet cut into 50 mm×50 mm was stuck to a melamine coated plate such that an air trapping in a circular shape having a hole diameter of 15 mm was formed, then the pressure sensitive adhesive sheet was pressed with a squeegee. As a result, the symbol ○ indicates that the air trapping was eliminated, Δ indicates that the air trapping was reduced, and x indicates that the trapped air remained.

Test of tensile strength: A pressure sensitive adhesive sheet was cut into 10 mm in width and 150 mm in length, and the release material was peeled. The pressure sensitive adhesive sheet (tape) was placed to a tensile strength tester (Tensilon manufactured by Orientec Co., Ltd.) in a clamping distance of 100 mm and was applied a tensile strength of 200 mm/min.

The symbol ○ indicates that the pressure sensitive adhesive sheet was not ruptured within 10 seconds, and x indicates that the pressure sensitive adhesive sheet was ruptured within 10 seconds.

Examination of hole visibility: A pressure sensitive adhesive sheet (if a release material was laminated, a pressure sensitive adhesive sheet from which the release material was peeled) was stuck to a white melamine coated plate. It was examined whether the hole itself of the through hole (internal space of the through hole) was visible or not to the naked eye at the surface of the pressure sensitive adhesive sheet depend on the hole diameter under room fluorescent lighting. Note that, the distance from the eyes to the pressure sensitive adhesive sheet was about 30 cm, and the angle of vision was variously changed.

The symbol ○ indicates that the internal spaces of the through holes were invisible, Δ indicates that the internal spaces of the through holes were partly invisible and partly visible, and x indicates that the internal spaces of the through holes were visible.

The results of each experiment are shown in Table 1.

TABLE 1

|  | Eliminating air trapping | Tensile strength | Appearance | Hole visibility |
|---|---|---|---|---|
| Example 1 | ○ | ○ | ○ | ○ |
| Example 2 | ○ | ○ | ○ | Δ |
| Example 3 | ○ | ○ | ○ | ○ |
| Example 4 | ○ | ○ | ○ | X |
| Example 5 | ○ | ○ | ○ | X |
| Example 6 | ○ | ○ | ○ | X |
| Example 7 | ○ | ○ | ○ | X |
| Example 8 | ○ | ○ | ○ | X |
| Example 9 | ○ | ○ | ○ | X |
| Example 10 | ○ | ○ | ○ | X |
| Example 11 | ○ | ○ | ○ | ○ |
| Example 12 | ○ | ○ | ○ | Δ |
| Example 13 | ○ | ○ | ○ | Δ |
| Example 14 | ○ | ○ | ○ | ○ |
| Example 15 | ○ | ○ | ○ | X |
| Example 16 | ○ | ○ | ○ | Δ |
| Comparative Example 1 | X | ○ | ○ | — |
| Comparative Example 2 | X~Δ | ○ | ○ | ○ |
| Comparative Example 3 | ○ | ○ | X | X |
| Comparative Example 4 | ○ | X | ○ | Δ~X |

It is clear that the pressure sensitive adhesive sheet obtained in Examples 1 to 16 can easily eliminate an air trapping and has a sufficient strength and its appearance is in a good condition from Table 1. Moreover, the hole itself of the through hole is invisible at the surface of the pressure sensitive adhesive sheet obtained in Examples 1, 3, 11 and 14 in particular.

A pressure sensitive adhesive sheet according to the present invention and a pressure sensitive adhesive sheet produced by the production method of the present invention can be preferably used when an air trapping or a blister is likely to be formed in general, for example, when the area of a pressure sensitive adhesive sheet is large, when gas is generated from the adherend or the like.

The invention claimed is:

1. A method for production of pressure sensitive adhesive sheet, comprising the steps of:
   preparing a pressure sensitive adhesive sheet comprising a base material, a pressure sensitive adhesive layer and, as desired, further a release material, and
   performing a hole-forming process on the pressure sensitive adhesive sheet to form through holes such that the hole diameter at the base material and the pressure sensitive adhesive layer is 0.1 to 300 μm and the hole density is 30 to 50,000/100 cm$^2$,
   wherein the hole-forming process is performed by laser beam machining, and
   the laser beam machining is performed while a process material is laminated on the surface of the base material, the process material is pulled as is from the base material such that any adhesive is not left on the surface of the base material.

2. The method for production of pressure sensitive adhesive sheet according to claim 1, wherein the process material is directly laminated on the surface of the base material.

3. The method for production of pressure sensitive adhesive sheet according to claim 1, wherein the hole-forming process is performed such that the hole diameter of the through holes at the surface of the pressure sensitive adhesive sheet is 40 μm or less.

4. The method for production of pressure sensitive adhesive sheet according to claim 1, wherein the hole-forming process is performed such that the hole diameter of the through holes gets gradually smaller from the back surface to the surface of the pressure sensitive adhesive sheet.

5. The method for production of pressure sensitive adhesive sheet according to claim 1, wherein the process material is a supporter of a resin solution for forming a layer by a cast film process.

6. The method for production of pressure sensitive adhesive sheet according to claim 1, wherein the process material is obtained by release processing on a paper or a resin film.

7. The method for production of pressure sensitive adhesive sheet according to claim 1, wherein
   the laser beam machining is performed from the back surface side of the pressure sensitive adhesive sheet, and
   the laser is directly radiated to the pressure sensitive adhesive layer.

8. The method for production of pressure sensitive adhesive sheet according to claim 1, wherein
   the laser beam machining is performed from the back surface side of the pressure sensitive adhesive sheet, and
   the release material laminated on the pressure sensitive adhesive layer is peeled from the pressure sensitive adhesive layer, a laser is directly radiated to the pressure sensitive adhesive layer, and then the release material is laminated again on the pressure sensitive adhesive layer.

9. A method for production of pressure sensitive adhesive sheet, comprising the steps of:
   preparing a pressure sensitive adhesive sheet comprising a base material, a pressure sensitive adhesive layer and, as desired, further a release material, and
   performing a hole-forming processing on the pressure sensitive adhesive sheet to form through holes such that the hole diameter at the base material and the pressure sensitive adhesive layer is 0.1 to 300 μm and the hole density is 30 to 50,000/100 cm$^2$,
   wherein the hole-forming processing is a laser beam machining, and
   the laser beam machining is performed while a removable protective sheet is laminated on the surface of the base material, the removable protective sheet is peeled as is from the base material such that any adhesive is not left on the surface of the base material.

10. The method for production of pressure sensitive adhesive sheet according to claim 9, wherein the removable protective sheet is directly laminated on the surface of the base material.

11. The method for production of pressure sensitive adhesive sheet according to claim 9, wherein the hole-forming processing is performed such that the hole diameter of the through holes at the surface of the pressure sensitive adhesive sheet is 40 μm or less.

12. The method for production of pressure sensitive adhesive sheet according to claim 9, wherein the hole-forming processing is performed such that the hole diameter of the through holes gets gradually smaller from the back surface to the surface of the pressure sensitive adhesive sheet.

13. The method for production of pressure sensitive adhesive sheet according to claim 9, wherein
the laser beam machining is performed from the back surface side of the pressure sensitive adhesive sheet, and
the laser is directly radiated to the pressure sensitive adhesive layer.

14. The method for production of pressure sensitive adhesive sheet according to claim 9, wherein
the laser beam machining is performed from the back surface side of the pressure sensitive adhesive sheet, and
the release material laminated on the pressure sensitive adhesive layer is peeled from the pressure sensitive adhesive layer, a laser is directly radiated to the pressure sensitive adhesive layer, and then the release material is laminated again on the pressure sensitive adhesive layer.

* * * * *